Dec. 13, 1938.  G. S. LUNGE  2,140,390
SPEED RESPONSIVE MEANS
Filed June 17, 1936
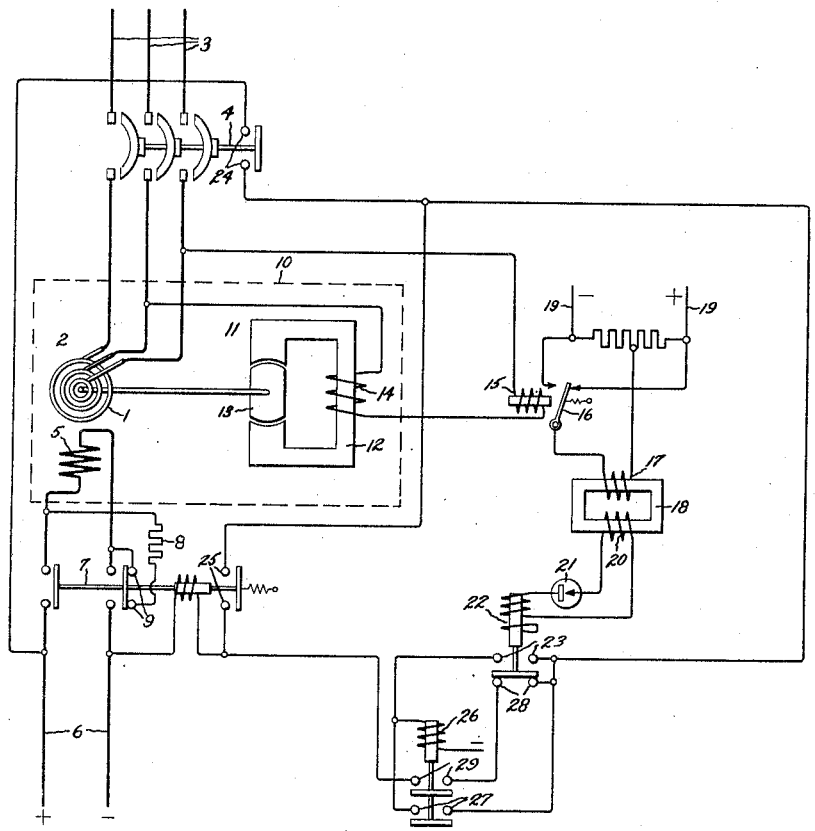
Inventor:
George S. Lunge,
by Harry E. Dunham
His Attorney.

Patented Dec. 13, 1938

2,140,390

UNITED STATES PATENT OFFICE 2,140,390

SPEED RESPONSIVE MEANS

George S. Lunge, Schenectady, N. Y., assignor to General Electric Company, a corporation of New York Application June 17, 1936, Serial No. 85,735

8 Claims. (Cl. 175—355)

My invention relates to speed responsive means and particularly to means for indicating the speed of a totally enclosed rotating device, such, for example, as a hydrogen-cooled dynamo-electric machine. With such a totally enclosed machine, it is usually inconvenient to install centrifugally operated speed responsive device within the gas tight enclosure because of the need for occasional inspection and calibration of such speed responsive devices. Also because of the rather complicated and expensive sealing apparatus required, it is not practical to install the centrifugally operated speed responsive device outside of the enclosure. One object of my invention is to provide a simple and reliable speed responsive means for a totally enclosed rotating device which does not have the above mentioned disadvantages, which are present when a centrifugally operated device is used.

My invention will be better understood from the following description when taken in connection with the accompanying drawing which diagrammatically illustrates a speed responsive arrangement embodying my invention, and its scope will be pointed out in the appended claims.

Referring to the drawing, 1 represents a dynamo-electric machine shown as a synchronous motor having its armature winding 2 arranged to be connected to a suitable source of alternating current 3 by a switch 4, and a field winding 5, which is arranged to be connected to a source of excitation 6 by means of a suitable field switch 7. Normally during the starting operation of the motor, the field winding 5 is short-circuited through a discharge resistor 8 by means of auxiliary contacts 9 on the field switch 7.

The motor 1 is enclosed in a gas-tight casing 10 which may be filled with any suitable gas, such as hydrogen. The casing 10 is provided with suitable gas-tight bushings, examples of which are well-known in the art, by means of which current may be supplied through the casing.

For effecting the operation of the field switch 7 when the motor reaches a predetermined speed, I have shown one embodiment of my invention which includes an impedance device 11 arranged inside the casing 10 in any suitable manner so that the impedance thereof is varied in response to variations in the speed of the motor. As shown, the impedance device 11 includes a stationary yoke-shaped magnetic core 12 and a magnetic member 13 rotatably mounted between the ends of the stationary core 12 and driven by the motor 1 so that as the motor speed varies the reluctance of the flux path through the core 12 is periodically varied at a rate proportional to the motor speed. A winding 14 is wound on the stationary core 12 and is connected in series with a relay 15 across one phase of the motor armature winding. The relay 15 is located outside of the casing 11 so that no circuit opening or closing operation is performed inside the casing. When the rotatable member 13 is in the position shown, the reluctance of the core 12 is a minimum and consequenly the impedance of the impedance device 11 is a maximum. When the member 13 is rotated ninety degrees from the position shown, the reluctance of the flux path through the core 12 is a maximum and the impedance of the impedance device 11 is a minimum.

The relay 15 is provided with a light armature 16 which is designed to respond to the current pulsations produced by the variations in impedance in the impedance device 11 when the magnetic member 13 is rotated by the machine 1, as long as such pulsations have less than a predetermined frequency. Thereafter the relay armature will remain in either the energized or deenergized position depending upon the magnitude of the current through the relay winding. The armature 16 is arranged, so that when it is in its deenergized position, as shown, it completes a circuit between the primary winding 17 of the transformer 18 and a source of direct current 19 so that current flows through the primary winding in one direction. When the relay 15 is in its energized position, its armature 16 changes the connections between the primary winding 17 and the source 19 so that the current flows through the winding 17 in the opposite direction. The secondary winding 20 of the transformer 18 is connected through a half-wave rectifier 21 to the operating winding of a suitable time relay 22, which is arranged to complete an energizing circuit for the closing coil of the field switch 7.

The operation of the arrangement shown in the drawing is as follows: When the motor 1 is started by closing the circuit breaker 4, the frequency of the variations in impedance produced in the impedance device 11 by the rotatable member 13 increases as the motor accelerates. These variations in the impedance of the device 11 cause a variation in the current flowing through the relay 15 so that this relay in turns causes its armature 16 to vibrate at a rate proportional to the speed of the motor. The vibration of the armature 16 varies the direction of current through the primary winding 17 of the transformer 18 so that the relay 22 is energized by current pulsations having a frequency proportional to the speed of the motor. While the motor is operating below a relatively low predetermined speed, the frequency of the current pulsations through the operating winding of the relay 22 is so low that the successive pulsations are so far apart that the relay does not pick up and close its contacts 23. However, when the motor reaches this predetermined speed, the current pulsations through the operating winding of the relay are close enough together to cause the relay to operate and complete through its contacts 23 and the auxiliary contacts 24 on the circuit breaker 4 an energizing circuit for the relay 26. By closing its contact 27, the relay 26 completes a locking for itself which is independent of the contacts 23.

When the motor reaches a predetermined speed nearer synchronous speed, the frequency of the current pulsations through the relay 15 become sufficiently high to prevent the armature 16 from vibrating. Consequently the relay armature 16 can no longer successively change the direction of current in the transformer primary winding 17 and therefore no current flows through the operating winding of relay 22, which thereupon becomes deenergized and closes its contacts 28 to complete through contacts 29 of relay 26 and contacts 24 on the circuit breaker 4 an energizing current for the closing coil of the field switch 7. By closing its main contacts, the field switch 7 connects the field winding 5 to the source of excitation 6 and by closing its auxiliary contacts 25, it completes a locking circuit for its closing coil. By opening its auxiliary contacts 9, the field switch disconnects the discharge resistor 8 from the field winding. While I have described my invention in connection with the automatic application of excitation to a synchronous motor, it is obvious that it may be used to actuate any suitable control means at any predetermined speed of the machine.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. A speed responsive arrangement for a rotating device including an electric circuit, a source of current connected to said circuit, an inductive device having a magnetic core and a winding on said core connected in said circuit, means driven at a speed proportional to the speed of said rotating device for periodically varying the reluctance of said core to produce current fluctuations in said circuit, and means responsive to the frequency of said current fluctuations produced in said circuit.

2. In combination, a gas-tight casing, a dynamo-electric machine in said casing, an electric circuit extending through said casing, a source of current connected to said circuit outside said casing, means inside said casing for producing in said circuit current pulsations varying in frequency directly with the speed of said machine, and means outside of said casing responsive to the frequency of said current pulsations.

3. In combination, a gas-tight casing, a dynamo-electric machine in said casing, an electric circuit extending through said casing, a source of current connected to said circuit outside said casing, means inside said casing for producing in said circuit current pulsations varying in frequency directly with the speed of said machine, a relay outside of said casing connected in said circuit, and means responsive to the frequency of vibration of the armature of said relay.

4. A speed responsive arrangement for a rotating device including an electric circuit, a source of current connected to said circuit, an impedance device connected in series with said circuit, means for periodically varying the impedance of said impedance device at a rate proportional to the speed of the rotating device to produce current variations in said circuit, a relay connected in said circuit, a transformer having a primary winding and a secondary winding, means responsive to the vibration of the armature of said relay for varying the current through said primary winding, a half-wave rectifier, and a time relay connected in series with said half-wave rectifier across said secondary winding.

5. A speed responsive arrangement for a rotating device including an electric circuit, a source of current connected to said circuit, an impedance device connected in series with said circuit, means for periodically varying the impedance of said impedance device at a rate proportional to the speed of the rotating device to produce current variations in said circuit, a relay connected in said circuit, a transformer having a primary winding and a secondary winding, a source of direct current connected to said primary winding, means controlled by said relay for reversing the connection between said source of direct current and primary windings, a half-wave rectifier and a time relay connected in series with said half-wave rectifier across said secondary winding.

6. A speed responsive arrangement for a rotating device including an electric circuit, a source of current connected to said circuit, an impedance device connected in series with said circuit, means for periodically varying the impedance of said impedance device at a rate proportional to the speed of the rotating device to produce current variations in said circuit, a relay connected in said circuit and having an armature arranged to be vibrated in response to said current variations when the frequency thereof is below a predetermined value, a transformer having a primary winding and a secondary winding, means responsive to the vibration of the armature of said relay for varying the current through said primary winding, a half-wave rectifier, a time relay connected in series with said half-wave rectifier across said secondary winding, a control device, and means dependent upon the picking up and the subsequent dropping out of said time relay for effecting the operation of said control device.

7. A speed responsive arrangement for a rotating device including an electric circuit, a source of current connected to said circuit, an inductive device having a magnetic core and a winding on said core connected in said circuit, means driven at a speed proportional to the speed of said rotating device for periodically varying the reluctance of said core to produce current fluctuations in said circuit, and means controlled by said current fluctuations in said circuit.

8. A speed responsive arrangement for a rotating device including an electric circuit, a source of current connected to said circuit, an inductive device having a magnetic core and a winding on said core connected in said circuit, means driven at a speed proportional to the speed of said rotating device for periodically varying the reluctance of said core to produce current fluctuations in said circuit, a control device, and means responsive to said current fluctuations for effecting the operation of said control device.

GEORGE S. LUNGE.